Figure 1:
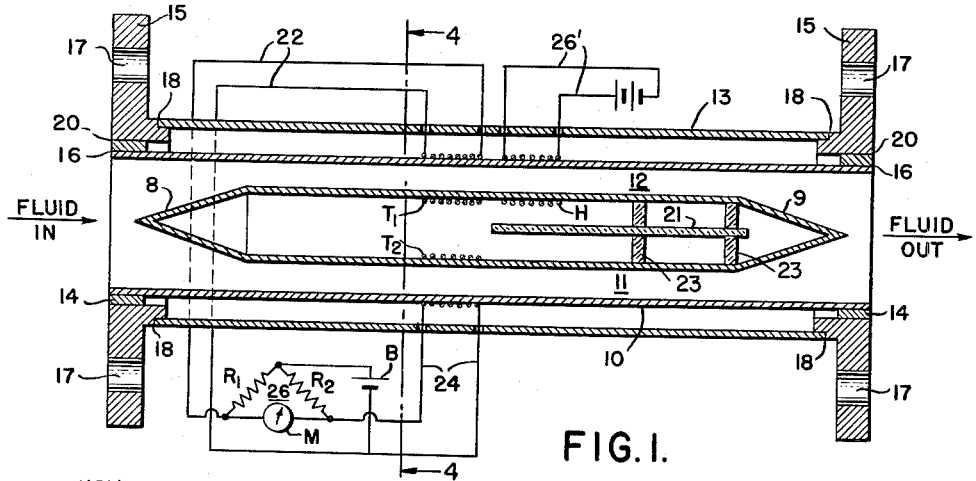

Jan. 2, 1962   N. SCHNOLL   3,015,232
FLOW CELL
Filed Oct. 2, 1957

INVENTOR.
Nathan Schnoll
BY Charles H. Brown
ATTORNEY

3,015,232
FLOW CELL
Nathan Schnoll, Englewood, N.J., assignor to Flow Measurements Corporation, Kensington, Md., a corporation of Maryland
Filed Oct. 2, 1957, Ser. No. 687,739
2 Claims. (Cl. 73—204)

This invention relates to a flow cell adapted for use in a system for measuring the rate of flow or quantity of flow of a fluid, such as for example gasoline, slurries, water, and gases.

In my copending application, Serial No. 674,854, filed July 29, 1957, there is described a flow cell and electronic flow meter system therefor. The flow cell of my copending application comprises an electric heating coil wound around the outside of the conduit through which the fluid to be measured flows, and two resistance temperature detectors (thermometers, effectively, which feed into a Wheatstone bridge) also wrapped around the outside of the pipe—one upstream from the heater coil and the other downstream. The heating coil and resistance temperature detectors are mounted in intimate thermal contact with the outer surface of the pipe which they surround. The temperature differential or gradient between the upstream and downstream thermometers due to the fluid flowing within the pipe is a function of both the fluid mass flow rate and the wattage dissipated in the heater coil. Any flow of liquid through the pipe will cause a temperature gradient in the pipe. The faster the flow rate the lower will be the temperature differential along the pipe, and vice versa. The amount of power (watts dissipated in the heater coil) supplied to the fluid to maintain a constant temperature differential between the two temperature detectors is a measure of the mass-flow rate. The flow cell lends itself to remote indication, recording and control, since it produces an electrical signal which varies over a wide range of flow rates. The rate of flow can be integrated so that continuous or pulsating flows can be measured in total.

Generally, these flow cells are inserted in the piping system through which the fluid flows and are arranged vertically. The overall length of the flow cell may vary from 1 to 2 feet, by way of example. I have found that the temperature gradient in the atmosphere in a normal room from floor to ceiling may easily be as great as 2 to 3 degrees F. and more. A pipe in the room extending vertically will also assume a temperature gradient depending upon its location and length. Along a length of pipe about 1 ft. long, the temperature difference at both ends, due to the atmospheric temperature gradient, may amount to ½° F. This temperature gradient may vary with the time of the day and room temperatures.

Temperature gradients may be introduced in the cell also, whether installed in a horizontal or vertical position, in numerous other ways such as by the addition or removal of heat to the fluid at some region of the flow system, or by differences in temperature between the main body of fluid and the piping in the region of the flow cell. At sufficiently high flow rates temperature gradients may arise due to friction between the fluid and the cell walls and piping.

Temperature differentials of the character just described, when introduced along the axis of flow of a flow cell of the kind described in my copending application, supra, employing a length of conduit with two sets of temperature thermometers and a heater, are undesirable, because they enter into and modify the temperature gradient introduced by the heater, and thus interfere with the calibration of the instrument coupled to the flow cell. It will be appreciated that because the undesired temperature gradients are in general not uniform and constant, it has not been possible heretofore to compensate for this undesired differential in temperature. Elimination of the undesired temperature differentials results in an improvement in the accuracy of the flowmeter; it also makes possible a reduction of the power required in the heater coil since satisfactory operation can now be obtained with smaller heater derived temperature differentials. The overall gain of the system due to decrease of heater power can be compensated for by additional amplification of the bridge output voltage. This makes possible use of the caloric flowmeter for flow rate measurements on fluids with lower boiling points or temperature sensitive characteristics, which it might otherwise not be practicable to handle.

Elimination of the undesired temperature differentials furthermore improves the response time and the smoothness of operation of the flowmeter for the following reason. Large sections of the piping, the outer elements of the cell structure, and large quantities of the fluid, enter into the determination of the undesired temperature gradients within the cell, hence long times are in general required for these gradients to assume equilibrium. On the other hand the heater induced temperature gradients involve elements of small mass and generally only the boundary layer of a short length of the fluid and a short length of thin-walled conduit.

An object of the present invention is to eliminate the effect of temperature gradients along a flow cell due to atmospheric or other causes other than that due to the heater within the flow cell.

A further object of my invention is to reduce the power required in the heater of the flow cell for satisfactory operation.

A still further object of my invention is to improve the response time and reduce the transients in response due to fluid and atmospheric temperature variations.

Another object is to provide a flow cell having a heater coil and a plurality of physically separated temperature sensitive detectors so arranged in intimate thermal contact with a metallic pipe through which fluid flows, that the temperature gradient or differential between the temperature detectors is a function of both the fluid mass flow rate and the wattage dissipated in the heater coil, but is independent of the fluid and surrounding temperatures.

Still another object is to eliminate the effect of temperature gradients along a pipe carrying fluid therein due to atmospheric and fluid flow causes, while retaining the effect of the temperature gradient caused by a heater in thermal contact with the pipe for measuring the rate of flow of the fluid.

Figure 3:
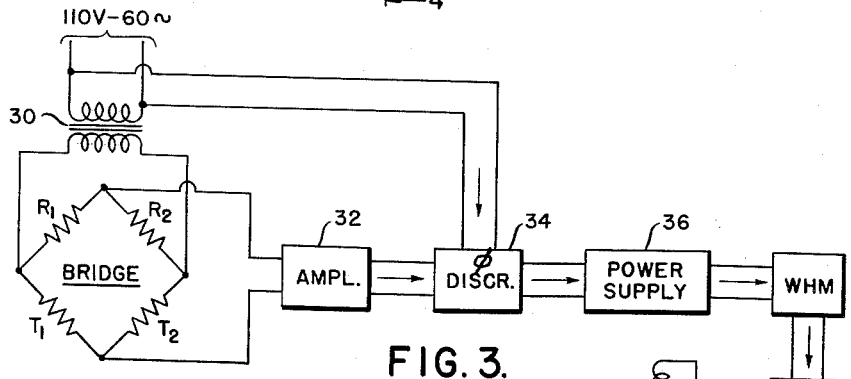
Figure 2:
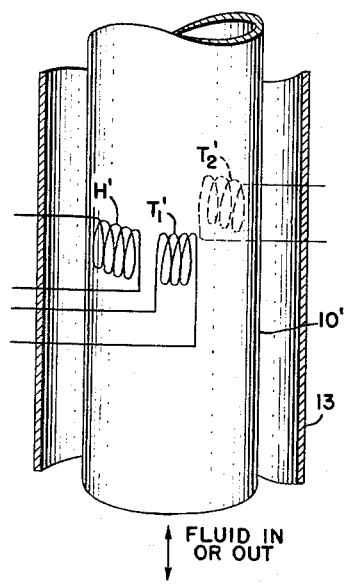
Figure 4:
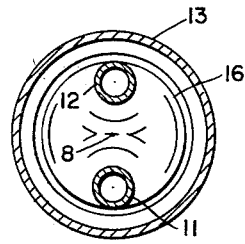

A more detailed description of the invention follows, in conjunction with a drawing, wherein:

FIG. 1 represents a schematic illustration of a system for measuring the flow of fluid with the flow cell of one embodiment of the invention shown mostly in cross-section;

FIG. 2 diagrammatically illustrates another embodiment of the flow cell of the invention;

FIG. 3 illustrates schematically the circuit diagram of another flow rate measuring system in which the flow cell of the invention may be used; and FIG. 4 is a sectional view taken on line 4—4 of FIG. 1.

Referring to FIG. 1 in more detail, the flow cell of the invention comprises a thin-walled cylindrical metallic tube 10 (for example, .015 inch thick) which is split in its interior into two identical cylindrical conduit channels 11 and 12 also formed by thin-walled tubing. These channels 11 and 12 are symmetrically positioned relative to the longitudinal axis of the flow cell and are provided with tapered end sections 8 and 9 to assure an even distribution of fluid through both channels. The tube 10 is surrounded by a thicker outer metal cylindrical tube 13

(for example .1 inch thick) sealed thereto. This cell is inserted into the pipe line, not shown, through which flows the fluid to be measured. Wrapped around the thin-walled channels 11 and 12 and sealed from the outer atmosphere are a heater coil H and resistance temperature detectors T1 and T2 also in the form of coils. The detectors T1 and T2 are identical in their characteristics, as far as possible. By way of example, T1 and T2 may each be 100 ohm nickel wire windings. The heater coil H may be nichrome wire or manganin. These coils are in intimate thermal contact with the surfaces of the thin-walled tubing. Heat is produced electrically in coil H. The wires making up coils H, T1 and T2 are surrounded by the usual insulation. An important feature is the symmetrical arrangement of temperature detectors T1 and T2 relative to each other and to the ends of the flow cell. Heater coil H is as close as possible to temperature detector T1, with a center-to-center coil separation of about 2 inches.

The interior of tube 10 and the thin-walled channels 11 and 12 have extremely smooth hollow interiors to provide a negligible pressure drop in the fluid passing therethrough in the direction of the arrows, and to enable easy cleaning. The tube 10 is welded at both ends at its outer edge 16 to the surrounding metallic collars 14. Outer tube 13 is welded at its outer edge 18 at both ends thereof to the shoulder portions of the metallic flanges 15. The flat outside end surfaces of flanges 15 are welded to the collars 14 at edge 20 corresponding to the outer peripheral areas of the collars. There is thus a liquid and gas-tight seal between tubes 13 and 10. Because of the manner of welding the flanges 15 and collars 14 together, the area of weld exposed to the fluid flowing through the interior of tube 10 is very small.

It will be understood that thin-walled tube 10 is merely bifurcated into the form of two tubes 11 and 12 which merge smoothly at their ends at 8 and 9 into a single large tube, the ends of which 16, are circular in cross-section. Since all the walls of both sections 11, 12 and section 16 are the same piece of metal, no additional support for tubes 11 and 12 is needed. FIG. 4 shows how tubes 11 and 12 merge at 8 into larger tube section 16.

All metallic parts 9, 10, 11, 12, 13, 14 and 15 are made of identical metal, such as stainless steel, or compatible metals to prevent electrolytic corrosion and attack on the metal parts at the joints. The use of identical or compatible metal parts also results in uniform thermal expansion and contraction characteristics, thus removing the possibility of error due to the transmission of stresses and strains in the metals to the temperature sensing coils on the channels 11 and 12, which might otherwise occur if uniform coefficient of expansion did not exist.

The ends of coils T1, T2 and H are electrically connected by wires to an external indicating or metering apparatus. In practice, the coils will be connected to the terminals or pins of an electrical socket mounted on outer tube 13. This socket is not shown in order not to detract from the clarity of the drawing, but may take the form illustrated and described in my copending application Serial No. 674,854. The socket would of course form a liquid-tight seal between the atmosphere and the space between outer tube 13 and inner tube 10. In this way, the coil windings T1, T2 and H are protected and sealed not only from the fluid being measured but also from the external atmosphere on the outside of tube 13 and which might contain fumes or water deleterious to the electrical coils.

The heavy flanges 15 are provided with holes 17 for the purpose of bolting the flow cell to the piping system. The stresses and strains of mounting the flow cell, and the handling thereof, are borne by the heavy flanges and the outer tube 13.

If desired, a thermal barrier 21, of insulation or metal or both may be used to prevent a free flow of heat from the heater coil H to the lower tubular channel 11.

The electrical circuit for producing an electrical output which is a function of the fluid flow rate includes a Wheatstone bridge 26 having a pair of fixed resistance arms R1 and R2 and the resistance temperature detector coils T1 and T2 as the other pair of arms. A battery B supplying, for example, 5 volts is connected across one diagonal of the bridge, while a meter M which might be a voltmeter or a microammeter is connected across the other diagonal of the bridge. The meter reading constitutes the output from the bridge and is a measurement of the temperature differential or gradient between the thermometers T1 and T2.

Because of the symmetrical arrangement of the temperature detectors about the same axis normal (transverse) to the longitudinal axis of the inner pipe of the cell, and relative to the ends of the flow cell, they will be equally affected, and to the same degree, by undesired temperature gradients along the axis of the flow cell due to the outside atmosphere or due to temperature gradients along the axis of flow of the fluid passing through the cell. For this reason, undesired temperature gradients will not affect the bridge, and the bridge will provide a measurement which is an accurate function of the temperature differential between detectors T1 and T2 resulting only from the fluid mass flow rate and the power dissipated in the heater coil and independent of the fluid and surrounding temperatures.

FIG. 2 illustrates a flow cell in accordance with another embodiment of the invention to eliminate undesired flow cell temperature gradients. The heater coil H' and the resistance temperature sensitive detectors T1' and T2' are placed in the same plane—normal to longitudinal axis of the flow cell. In this embodiment, there is only a single cylindrical inner thin-walled metallic tube 10' surrounded by the thicker outer metallic tube 13. The coils H', and T1' and T2' are wound flat and taped down in intimate thermal contact with the metal tube 10'. The heater coil H' and the low temperature detector coil T2' are positioned at opposite sides of the tube 10'. The high temperature detector coil T1' is placed as closely as possible to the heater coil H'. The manner of mounting the metal tubes of the flow cell of FIG. 2 and the connections from the ends of the coils to the external terminal socket may follow the teachings described above in connection with the flow cell of FIG. 1 and the flow cell described in my copending application, Serial No. 674,854. The bi-directional arrows shown in FIG. 2 indicates that the fluid may flow through the cell in either direction for measurement.

FIG. 3 illustrates diagrammatically another electrical measuring circuit in which the flow cell of the invention may be used. The circuit differs from that shown in FIG. 1 mainly in the use of an alternating current supply feeding, via transformer 30, one diagonal of the bridge, and the method of measuring the output from the bridge. A change in the rate of flow through the flow cell provides an unbalance in the bridge which is amplified in amplifier 32 and detected in phase discriminator 34. The output from the discriminator controls the power from power supply 36 which feeds the heater coil H. A watthourmeter WHM and a wattmeter respectively read the power integrated with time and the power only respectively, to the heater. These may then be calibrated in terms of total flow and flow rate. The direction of change of output from the power supply 36 is such as to restore bridge null balance. Operation is accomplished without mechanical devices or opening or closing of contacts.

The invention is not limited to the use of a metal conduit or pipe through which the fluid to be measured flows, but may include a conduit made of thin-walled glass, plastic or other material which will readily transfer heat from the fluid to the various thermal elements of the flow cell, and vice versa, or to a combination of these materials. Hence, the term "conduit" or "pipe" as used in the appended claims is deemed to include metal as well as insulation for containing the fluid to be measured.

The invention also has application to a method of measuring the flow rate and total flow of a stream where the flow cell of the invention is immersed in the stream.

What is claimed is:

1. In a flow system having a conduit through which the fluid to be measured flows, said conduit having undesired temperature gradients present along the axis of flow, a pair of temperature sensing resistance elements in temperature transfer relation to the fluid in said conduit, said temperature sensing elements being symmetrically positioned relative to the longitudinal axis of said conduit at points between which said undesired temperature gradients are substantially zero, and an electrical heater element also in temperature transfer relation to the fluid in said conduit positioned closer to one sensing element than to the other, wherein said pipe is a single smooth bore conduit, the heater and one temperature sensitive detector being on opposite sides of the pipe, the other temperature sensitive detector being close to the heater, said detectors and heater being wound and secured to the outside of said pipe, and an outer tube surrounding the detectors and heater and spaced therefrom, and means for joining said inner pipe and outer tube in a gas-tight relationship, and electrical connections from the temperature sensitive detector and the heater to the outside of said outer tube.

2. A flow cell for measuring the flow of a fluid, comprising a pipe through which the fluid to be measured is adapted to flow, a pair of temperature sensitive resistance detectors in thermal contact with the pipe and arranged to be responsive to the temperature of the fluid flowing through the pipe, both said temperature sensitive detectors being positioned to measure the temperature difference between two points in a plane normal to the longitudinal axis of the pipe at points between which the undesired temperature gradients are zero, whereby one detector is the same proportionate distance from the ends of the pipe as the other detector, and a heater in thermal contact with said pipe but thermally closer to one of said detectors than the other, the temperature sensitive detectors being wires wound as coils, and the heater being also a coil, all coils being wound flat and secured to the outside of said pipe.

References Cited in the file of this patent

UNITED STATES PATENTS

| | | |
|---|---|---|
| 2,603,089 | Morley et al. | July 15, 1952 |
| 2,709,365 | Piety | May 31, 1955 |
| 2,777,325 | Groenhof et al. | Jan. 15, 1957 |

FOREIGN PATENTS

| | | |
|---|---|---|
| 799,747 | France | Apr. 11, 1936 |
| 802,705 | France | June 13, 1936 |
| 591,690 | Great Britain | Aug. 26, 1947 |
| 649,030 | Great Britain | Jan. 17, 1951 |